Patented Apr. 30, 1929.

1,711,411

UNITED STATES PATENT OFFICE.

RICHARD GÜNTZEL, OF SAALFELD-SAALE, GERMANY, ASSIGNOR TO THE FIRM SCHIE-FERWERKE AUSDAUER AKTIENGESELLSCHAFT, OF PROBSTZELLA, THURINGIA, GERMANY.

METHOD OF PRODUCING A VISCOUS PHENOL CONDENSATION PRODUCT.

No Drawing. Application filed March 8, 1928, Serial No. 260,253, and in Germany March 10, 1927.

The aim of the present invention is to produce a particular type of condensation product, which is preeminently suitable for the production of insulating sheets by a cold process with subsequent hardening. Initial materials for the new condensation product are formaldehyde, commercial phenol and p-dichlorobenzene. As condensation catalyst, use is made of a mixed salt consisting of hexamethylene tetramine, sodium chloride and ammonium chloride, which is prepared by introducing formaldehyde or formaline into an aqueous solution of ammonium chloride, which is supersaturated with sodium bicarbonate. It has been found that this salt mixture is an excellent catalyst.

The condensation product can be prepared according to the following example:

1 lit. of the usual crystallized commercial phenol is liquefied by heating and mixed with about 600 ccms. 40% formaldehyde solution. A quantity of p-dichlorobenzene corresponding to about 8% of the amount by weight of the phenol used is then added, heating being continued until this substance is also liquefied. If the whole is vigorously stirred, it dissolves to form a homogeneous mixture. To this mass is then added a mixed salt, consisting of about 60 parts common salt, 10 parts ammonium chloride and 30 parts hexamethylene tetramine, in a quantity corresponding to about 1% of the amount by weight of the phenol used. The whole is now heated to boiling, using a reflux condenser. A condensation product is formed, which soon separates from the water. The heating is now discontinued, and after waiting for a time until the reaction is complete, the water is drawn off. Evaporation is carried out for a time and then cold water poured in while stirring. A further vigorous reaction takes place and the parts coming to the surface upon stirring, decompose showing a colour phenomenon (rainbow colours). This reaction is assisted by breaking up the clear film of resin which is formed and bringing other parts to the top until the reaction has ceased. The water is then renewed, until after changing the water several times, no further reaction occurs. The water is now removed by decanting with subsequent evaporation of the last traces. A liquid product of syrup-like consistency and light in colour is obtained. The mass is now ready to be used for the purpose in view. By hardening it can be converted in a known manner into solid bodies. The hardened products are of light to dark-yellow colour, transparent to translucent and are electrified by friction like amber.

The non-hardened, viscous mass has the advantage over other condensation products that it can be converted into a hard, solid mass in a very short time, by being only slightly heated to about 80° C. A subsequent slight heating of comparatively short duration is then sufficient to impart to the substances prepared from the mass, a degree of hardness which in the case of other known condensation products heated to the same or greater extent, is only obtained after several days or weeks.

What I claim is:—

1. A method of producing a viscous condensation product, consisting in heating to boiling point a mixture of phenol, p-dichlorobenzene and formaldehyde in the presence of a mixed salt consisting of common salt, ammonium chloride and hexamethylene tetramine, eliminating the water which separates out, driving off volatile vapors, washing carefully with water and thereupon hardening as and for the purpose set forth.

2. A method of producing a viscous condensation product, consisting in heating to boiling point a mixture composed of about 8% by weight of p-dichlorobenzene to each litre of crystallized commercial phenol and about 600 ccms. of a 40% formaldehyde solution, in the presence of a quantity corresponding to about 1% of the weight of the phenol, of a mixed salt composed of about 60 parts common salt, 10 parts ammonium chloride and 30 parts hexamethylene tetramine, eliminating the water which separates out, driving off volatile vapors, washing carefully with water and thereupon hardening as and for the purpose set forth.

In testimony whereof I hereunto affix my signature.

RICHARD GÜNTZEL.